United States Patent Office 3,654,365
Patented Apr. 4, 1972

3,654,365
PROCESS FOR THE PREPARATION OF
PARA-AMINOPHENOL
Henri Daunis, Vienne, and Philippe Perras, Lyon, France, assignors to Rhone-Poulenc S.A., Paris, France
No Drawing. Filed Jan. 29, 1969, Ser. No. 795,052
Claims priority, application France, Jan. 30, 1968,
138,001
Int. Cl. C07c 91/44
U.S. Cl. 260—575          11 Claims

ABSTRACT OF THE DISCLOSURE para-Aminophenol is made in good yield by hydrogenation of nitrobenzene in the presence of a strong acid and a platinum catalyst at a hydrogen pressure above one atmosphere.

---

The present invention relates to the preparation of para-aminophenol by catalytic hydrogenation of nitrobenzene in the presence of a strong acid.

para-Aminophenol is an industrial product which is extensively used in the dyestuff and pharmaceuticals industries. Its production from nitrobenzene is described in U.S. patent specification No. 2,198,249 in which it is proposed to mix nitrobenzene with a strong acid and then carry out a catalytic hydrogenation, preferably under pressure. The process described in this patent however offers little advantage because it does not allow high yields of para-aminophenol to be obtained.

U.S. patent specification No. 2,765,342, describes an improvement in the abovementioned process, in which excellent yields of para-aminophenol are obtained provided the partial pressure of hydrogen is kept below 1 atmosphere and the nitrobenzene is introduced at such a speed that its solubility in the reaction medium is not exceeded. Since the nitrobenzene concentration is difficult to control, British patent specification No. 856,366 describes the addition of a porous compound to the medium so as to absorb any excess insoluble nitrobenzene which could deactive the catalyst.

The limitation of the partial pressure of hydrogen to 1 atmosphere represents a handicap because the speed of hydrogenation is a function of this pressure. It would thus be preferable to work under a higher partial pressure of hydrogen so as to reduce the duration of the reaction. However if higher hydrogen pressures than atmospheric are used, aniline and not para-aminophenol is obtained (see U.S. patent specification No. 2,765,342).

The present invention provides a process for the preparation of para-aminophenol which comprises hydrogenating nitrobenzene in the presence of a catalyst based on platinum, in an aqueous solution of a strong acid, under a partial pressure of hydrogen exceeding 1 atmosphere, the nitrobenzene being continuously injected into the reaction medium. para-Aminophenol is thus obtained in excellent yields (of the order of 80%) and a significant reduction in the duration of the reaction is achieved.

The catalyst used in the new process is based on platinum. The amount of catalyst used is an important factor in the reaction because too low a quantity increases the duration of the opeartion whilst too large a quantity threatens to favour the formation of aniline at the expense of para-aminophenol. A preferred way of carrying out the invention consists of using 0.001% to 1%, preferably 0.01% to 0.1%, of platinum based on the weight of nitrobenzene employed in the reaction. The platinum is generally deposited on an inert carrier such as carbon black, which may or may not be porous, the proportion of platinum being advantageously from 0.1% to 15%, preferably 0.5% to 5%, of the weight of the carrier.

The reaction is carried out in the presence of an aqueous solution of a strong acid such as for example sulphuric acid or phosphoric acid. The optimum acid concentration in the reaction medium varies with the nature of the acid and the other working conditions; however, when using sulphuric acid (or phosphoric acid) aqueous solutions in which the concentration is 1% to 25% of acid, preferably 10% to 20% by weight, are generally very suitable.

The hydrogenation temperature, the value of which depends on the catalyst used, is generally from 50° C. to 150° C. In the case of platinum deposited on carbon, it is preferable to work at 85° C. to 120° C.

The partial hydrogen pressure is kept at above 1 atmosphere. The upper limit is not critical but there is generally little value in exceeding pressures of the order of 20 to 25 atmospheres.

To obtain good yields of para-aminophenol it is essential to add the nitrobenzene continuously at a rate which is carefully chosen at the start since this speed plays a considerable role in the development of the reaction. The particular speed which gives best results depends greatly on the other reaction conditions and in particular on the partial hydrogen pressure, on the activity of the catalyst employed, and on the speed of stirring. It has been found that too low a speed of injection favours the formation of secondary products arising from a more far-reaching hydrogenation, whilst too high a speed threatens to cause a reduction in the degree of conversion of the nitrobenzene. The stirring is so adjusted that the speed at the end of the stirrer blade is generally between 1.5 and 5 metres/second and preferably between 2 to 4 metres/second. As a rule, though this limit is not essential, it is preferable not to exceed the speed of injection beyond which nitrobenzene separates out in the reaction medium.

This injection may be equally well carried out with pure nitrobenzene or, in order to keep a constant concentration of acid in the medium, with a mixture of nitrobenzene and, for example, sulphuric acid.

So as to minimise the deactivating effect of the excess nitrobenzene a finely divided material capable of absorbing this excess may be added in proportions from 0.1 to 5% based on the weight of the acid solution, as described in British patent specification No. 856,366. Kieselguhr and active charcoal are suitable absorbent materials. Equally, certain compounds which favour the formation of para-aminophenol may be introduced into the reaction medium. In this respect there may be mentioned compounds which are soluble in water and inert towards sulphuric acid and which contain a quaternary ammonium group such as for example cetyltrimethylammonium bromide, octadecylammonium chloride or C-cetylbetaine. These compounds are generally added at a concentration of 0.01% to 0.5% based on the weight of the acid solution.

In practice, the following procedure can be followed: The catalyst, and optionally an absorbent and a compound containing quaternary ammonium groups, are first introduced into an autoclave followed by the dilute strong acid. The apparatus is purged with nitrogen and then with hydrogen, and brought to the temperature and partial hydrogen pressure selected. Stirring is then started and the nitrobenzene injected at the selected speed whilst keeping the temperature and the partial hydrogen pressure constant. When the injection is complete, the mixture is cooled to ambient temperature, the autoclave is purged with nitrogen, the pressure is released and the reaction product is filtered so as to separate the catalyst and the absorbent material (if any). The catalyst may be recycled as such during subsequent experiments. It preserves practically the same activity over a large number of experiments.

The para-aminophenol formed during the reaction is then isolated by the usual separation methods. The final mixture can for example be stripped with steam to remove excess nitrobenzene which may be present, neutralised, the aniline liberated stripped with steam, and the para-aminophenol obtained from the stripped residue by crystallisation.

The following examples illustrate the invention.

EXAMPLE 1

In this example a series of experiments is carried out under partial hydrogen pressures of 10 and 3.2 atmospheres in each case using two speeds of injection of nitrobenzene, one being the optimum speed under the working conditions in question and the other a higher speed. By way of comparison, an experiment carried out at 0.53 atmosphere is also given.

The typical experiment is carried out as follows. The process is carried out in a glass-lined steel autoclave of 4 litres capacity provided with an "impeller" type of stirrer rotating at 480 revolutions per minute (stirrer diameter 64 mm.). This autoclave is equipped with an enamelled thermometer sleeve dipping in to half its height. The gas feed and nitrobenzene feed are respectively provided by two stainless steel tubes, the first being flush with the wall of the autoclave whilst the second dips 4 to 5 cm. into the autoclave. The apparatus is heated by circulating a fluid in a double jacket. The autoclave is heated to 60° C. and the following are then successively introduced: 1.97 g. of a catalyst containing 5% of platinum deposited on carbon black (a commercial catalyst manufactured by Engelhard—specific surface about 900 m.$^2$/g.) for the experiments at 3.2 and 10 atmospheres of hydrogen, or 4.92 g. of the same catalyst for the experiment at 0.53 atmosphere; 9.84 g. of carbon black (Acticarbon 2–S of the "Carbonisation et Charbons Actifs" Company—specific surface about 1100 m.$^2$/g.); 1.92 g. of cetyltrimethylammonium bromide; 2386 g. of water; and 417.4 g. of 92% sulphuric acid. After closing the autoclave and purging it with nitrogen and then with hydrogen, this mixture is raised to 95° C. under the selected partial hydrogen pressure. Stirring is then started and 492 g. of nitrobenzene are injected at the selected speed as indicated in the table below. When the injection is complete the autoclave is cooled to about 40° C., purged with nitrogen, and the pressure released to atmospheric pressure.

The reaction product is filtered to separate the carbon black and the catalyst, and thereafter subjected to steam stripping to remove the excess nitrobenzene. 2.5 g. of sodium hydrosulphite are added to the stripping residue, which is then adjusted to pH 7–8 by adding about 850 cm.$^3$ of concentrated ammonia solution (d.=0.92). A fresh steam stripping is thereafter carried out to remove the aniline formed and the stripping residue is again adjusted to pH 7–8 by adding concentrated ammonia. The mixture is crystallised at 5° C., filtered, and the crystals of para-aminophenol are suction-dried, and then dried at 50° C. under a reduced pressure of 50 mm. of mercury.

The mother liquors are concentrated in vacuo to 1500 cm.$^3$ and then again subjected to crystallisation at 5° C. after re-adjusting the pH to 7–8 with concentrated ammonia. A fresh fraction of para-aminophenol is obtained which is combined with the preceding fraction. The results obtained in the various experiments are given in the table below:

TABLE

| Partial hydrogen pressure, atm. | Speed of injection of nitrobenzene, cm.$^3$/ hour | Degree of conversion of the nitrobenzene, percent | Yield of para-aminophenol, percent |
|---|---|---|---|
| 0.53 | 27.2 | 97 | 78 |
|  | 36.8 | 61.5 | 65.5 |
| 3.2 | 50.1 | 98.5 | 80.5 |
|  | 58.6 | 85 | 75 |
| 10 | 160 | 99 | 80 |
|  | 213 | 73 | 78 |

It will be seen from this table that the optimum speed of injection—the first speed quoted—increases with the partial pressure of hydrogen. It is thus noted that at practically identical yields of para-aminophenol the duration of the operation is six times shorter at 10 atmospheres than at 0.53 atmosphere though in this latter case the amount of catalyst is 2.5 times greater. It will also be noticed that a higher speed of injection very rapidly reduces the degree of conversion of the nitrobenzene.

EXAMPLE 2

Two experiments are carried out by working as in the preceding example, with 1.97 g. of catalyst, a speed of injection of 160 cm.$^3$/hour and a partial hydrogen pressure of 10 atmospheres. These experiments have the following special features:

Experiment No. 1: carried out without adding carbon black

Experiment No. 2: carried out without adding carbon black or cetyltrimethylammonium bromide.

The degree of conversion of the nitrobenzene and the yield of para-aminophenol are respectively 96.5% and 74.5% in Experiment No. 1 and 98.5% and 64% in Experiment No. 2.

EXAMPLE 3

During this experiment 3.94 g. of a catalyst containing 2.5% of platinum deposited on carbon black (Acticarbon 3–S of the "Carbonisation et Charbons Actifs" Company; specific surface: 1200 m.$^2$/g.) and 7.87 g. of carbon black S (from the same company) are used. The other amounts of reagents are as in Example 1. The apparatus is that of Example 1. The speed of stirring is 450 revolutions per minute. The nitrobenzene is injected at the rate of 100 cm.$^3$/hour, whilst working under a partial pressure of hydrogen of 4 bars. The degree of conversion of the nitrobenzene is 100% and the yield of para-aminophenol 74.5%.

EXAMPLE 4

9.84 g. of a catalyst containing 1% of platinum deposited on non-porous carbon black (acetylene black y, compression 1, from Compagnie Francaise des Matieres Colorantes; specific surface: 86 m.$^2$/g.) and 9.84 g. of Acticarbon 2–S are used during this experiment. The procedure of Example 3 is followed, with the same amounts of reagents, but under a partial pressure of hydrogen of 10 bars and with the nitrobenzene being injected at the rate of 200 cm.$^3$/hour. The degree of conversion of the nitrobenzene is 99.6% and the yield of para-aminophenol 79.4%.

EXAMPLE 5

1.97 g. of a catalyst containing 5% of platinum deposited on non-porous carbon black (acetylene black, Shawinigan, 50% compression; specific surface: 52 m.$^2$/g.) and 9.84 g. of Acticarbon 2–S are used during this experiment. The procedure of Example 3 is followed, under a partial pressure of hydrogen of 10 bars and with the nitrobenzene being injected at the rate of 350 cm.$^3$/ hour. The degree of conversion of the nitrobenzene is 100% and the yield of para-aminophenol 83%. 10 successive experiments are carried out with the same catalyst, during which the catalyst preserves the same activity.

We claim:

1. A process for the preparation of para-aminophenol which consists essentially of hydrogenating nitrobenzene in the presence of a catalyst consisting essentially of metallic platinum in an aqueous solution of a strong acid under a partial pressure of hydrogen exceeding 1 atmosphere, the nitrobenzene being injected continuously into the reaction medium.

2. A process according to claim 1 in which the speed of injection used is below that which causes the nitrobenzene to separate out as a distinct phase in the reaction medium.

3. A process according to claim 1 in which a compound which is soluble in water and contains a quaternary ammonium group is added to the reaction medium, in a proportion of 0.01 to 0.5% by weight of the acid solution.

4. A process according to claim 1 in which a finely divided material capable of absorbing nitrobenzene is added to the reaction medium, in a proportion of 0.1 to 5% by weight of the acid solution.

5. A process according to claim 1 in which the platinum catalyst is present in an amount of 0.001 to 1% by weight of the nitrobenzene.

6. A process according to claim 1 in which the platinum catalyst is supported on carbon black in a concentration of 0.1 to 15% by weight.

7. A process according to claim 1 in which the strong acid is sulphuric acid (or phosphoric acid) in a concentration of 1 to 25% by weight.

8. A process according to claim 1 in which the hydrogenation temperature is 50° to 150° C.

9. A process according to claim 8 in which the hydrogenation temperature is 85° to 120° C. and the platinum catalyst is supported on carbon black.

10. A process according to claim 1 in which the partial pressure of hydrogen is up to 25 atmospheres.

11. A process according to claim 1 wherein the platinum catalyst is present in an amount of 0.01 to 0.1% by weight of the nitrobenzene and is supported on carbon black, the amount of platinum on the carbon black being 0.5 to 5% by weight, wherein the strong acid is sulphuric acid in a concentration of 10 to 20% by weight, and wherein the partial pressure of hydrogen is up to 25 atmospheres.

References Cited

UNITED STATES PATENTS

| | | | |
|---|---|---|---|
| 2,132,454 | 10/1938 | Bassford, Jr. | 260—575 |
| 2,198,249 | 4/1940 | Henke et al. | 260—575 (X) |
| 2,765,342 | 10/1956 | Spiegler | 260—575 |
| 2,823,235 | 2/1958 | Graham | 260—575 (X) |
| 3,265,735 | 8/1966 | Bradbury | 260—575 |

FOREIGN PATENTS

| | | | |
|---|---|---|---|
| 856,366 | 12/1960 | Great Britain | 260—575 |
| 1,028,078 | 5/1966 | Great Britain | 260—575 |

OTHER REFERENCES

Groggins, Unit Processes in Organic Synthesis: New York, McGraw-Hill Cook Co., Inc., 1958, p. 175.

HENRY R. JILES, Primary Examiner

C. F. WARREN, Assistant Examiner